Patented Jan. 26, 1926.

1,570,876

UNITED STATES PATENT OFFICE.

ARTHUR H. COMPTON, OF ST. LOUIS, MISSOURI, ASSIGNOR TO WESTINGHOUSE LAMP COMPANY, A CORPORATION OF PENNSYLVANIA.

GLASS AND ARTICLE MADE THEREFROM.

No Drawing.  Application filed October 16, 1920.  Serial No. 417,378.

*To all whom it may concern:*

Be it known that I, ARTHUR H. COMPTON, a citizen of the United States, and a resident of St. Louis, in the county of St. Louis and State of Missouri, have invented a new and useful Improvement in Glass and Articles Made Therefrom, of which the following is a specification.

This invention relates to vapor electric devices, and more particularly to the glass composing the containers thereof.

An object of the invention is the provision of a vapor electric device in which the principal source of light is derived from one of the alkali metals when in a vaporized state.

Another object of the invention is to provide an improved method of making a glass characterized particularly by the property of being resistant to the chemical action of the alkali metals or their vapors, and various combinations thereof.

Another object of the invention is the provision of a glass which may be regarded as coming within the class usually termed "hard" or "heat-resisting" glass.

Other objects of the invention have to do with various features which will hereinafter be more fully described and set forth in the appended claims.

It is well known that sodium and metals of the same periodic group, chemically attack ordinary glass, effecting its decomposition and a resultant blackening or loss of transparency. The attacking of the glass by these metals has been a serious drawback to the development of a lamp utilizing one of them as a light source and is the principal reason why a sodium-vapor lamp, for instance, has not heretofore been commercially exploited, although a lamp of this type has an operating efficiency much greater than that of any lamp now in commercial use. Consequently, in order to put into practical use the sodium-vapor lamp, it was necessary to find a glass or other medium which would be capable of transmitting light and would not be seriously injured by the chemical action of sodium and its vapor.

After many trials and experiments, I have succeeded in obtaining a glass that, for all practical purposes, successfully resists the action of metals belonging to the sodium group. The composition of this glass is substantially limited to those oxides or to compounds which, by suitable treatment, produce such oxides, which are capable of combining, upon fusion, to form a transparent or translucent workable glass not readily decomposed or discolored by the vapors of sodium, potassium, lithium, etc.

In determining the proper proportions of the several materials used in making glass in accordance with the invention, attention must be paid to the necessity of having the glass possess workable properties so that it may be easily formed into containers of such shapes as are dictated by use, efficiency of design and appearance. It must of necessity have light-transmitting qualities.

It is to be understood that, by changing the proportions of the materials specified for making the glass, it is possible to control such variable factors as its workability, transparency, coefficient of expansion and the power to resist the chemical action of the metal enclosed within a container made therefrom.

Although the invention, in its broadest aspect, relates to a glass resistant to the chemical action of all of the alkali metals, for the sake of convenience and illustrative purposes there is set forth in detail a formula which has given satisfactory results where metallic sodium is used as the vaporizable material in a vapor electric device, i. e., sodium-vapor lamp.

In the preparation of such glass the following oxides may be used, preferably in the indicated proportions, by weight:

|  | Per cent. |
|---|---|
| Sodium oxide | about 13 |
| Aluminum oxide | about 15 |
| Calcium oxide | about 12 |
| Boron oxide | about 60 |
| Total | 100 |

Other oxides may be used, in addition to, or in the place of, some of the oxides mentioned in the above formula, which are capable of forming a glass equally as good. These are the oxides of lithium, potassium, magnesium, barium, strontium, rubidium, thorium, zirconium, etc.

It is to be understood that the above substances, when first introduced into the batch for melting, are not necessarily in the form of oxides but may be in the form of compounds, which, upon proper treatment, as for example, in some instances heating in the air, will produce the oxide. For example, it is customary to use calcium and sodium carbonates for fusing purposes which, on long heating, change to the oxide.

The batch resulting from using the above formula is heated in any approved manner until fusion is effected. Upon fusion, a transparent glass is obtained which is workable without fear of devitrification, and is not blackened or seriously affected by the chemical action of sodium or like metals. Furthermore, the glass produced according to this invention is capable of readily withstanding operating temperatures ranging from 400° to 600° C., which properly makes its use very satisfactory for vapor electric devices of various sorts.

It is obvious to those skilled in the art that changes may be made in the formula given which will effect modifications in the transparency of the glass obtained, its workability, etc., and that it may be found desirable to control the color of the glass from the standpoint of spectrum characteristic, which latter feature will be determined largely by the metal employed as a light source and the use to which the lamp is subjected.

It is desired not to be confined to the exact materials or proportions of materials herein specified, as such materials and proportions are given merely as an example of what has been found to be satisfactory in the manufacture of a glass coming within the scope of the invention and as especially suitable as a container for a sodium-vapor lamp. It will therefore be understood that modifications may be made without departure from the spirit and scope of the invention.

What is claimed is:

1. A glass resistant to the chemical action of vapors of metals of the sodium group, comprising boron oxide, and basic oxides including at least one alkali metal oxide, at least one of the following oxides, namely, calcium, barium, strontium or magnesium oxide, and aluminum oxide.

2. A glass resistant to the chemical action of vapors of metals of the sodium group, comprising boron oxide, at least one alkali metal oxide, at least one of the following oxides, namely, calcium, barium, strontium and magnesium oxide, and aluminum oxide.

3. A glass resistant to the chemical action of vapors of metals of the sodium group, comprising about 60% of boron oxide, about 12% of one of the following oxides, namely, calcium, barium, strontium or magnesium oxides, about 13% of an alkali oxide, and about 15% of aluminum oxide.

4. As a new article of manufacture, an electric lamp envelope consisting of a fused mixture of boron oxide and basic oxides including at least one alkali metal oxide, at least one of the following oxides, namely, calcium, barium, strontium or magnesium oxide, and aluminum oxide.

5. As a new article of manufacture, an electric lamp envelope consisting of a fused mixture of boron oxide, at least one alkali metal oxide, at least one of the following oxides, namely, calcium, barium, strontium or magnesium oxide, and aluminum oxide.

6. As an article of manufacture, a glass made from a fusion of the following constituents: Sodium oxide about 13%, aluminum oxide about 15%, calcium oxide about 12% and boron oxide about 60%.

7. As a new article of manufacture, an electric lamp envelope consisting of a fused mixture of the following materials in the indicated proportions by weight: sodium oxide about 13%, aluminum oxide about 15%, calcium oxide about 12% and boron oxide about 60%.

In testimony whereof, I have hereunto subscribed my name this 11th day of October, 1920.

ARTHUR H. COMPTON.